__United States Patent__ [19]

Kleber et al.

[11] 3,985,939

[45] Oct. 12, 1976

[54] PROCESS FOR THE MANUFACTURE OF ANTISTATIC FIBERS AND SHEETS OF POLYACRYLONITRILE

[75] Inventors: Rolf Kleber, Neu Isenburg; Sigurd Wetzel, Niedernberg, both of Germany

[73] Assignee: Hoechst Aktiengesellschaft, Frankfurt am Main, Germany

[22] Filed: Sept. 9, 1975

[21] Appl. No.: 611,781

Related U.S. Application Data

[63] Continuation of Ser. No. 509,703, Sept. 26, 1974, abandoned.

[30] Foreign Application Priority Data

Sept. 29, 1973  Germany............................ 2349148

[52] U.S. Cl. .................................................... 526/3
[51] Int. Cl.² ........................................... C08K 5/42
[58] Field of Search.............. 260/45.9 AA, 85.5 S, 260/88.7 B, DIG. 15; 526/3

[56] References Cited

UNITED STATES PATENTS

| | | | |
|---|---|---|---|
| 2,726,132 | 12/1955 | Craig.............................. | 260/88.7 B |
| 3,376,277 | 4/1968 | Seifert........................... | 260/88.7 B |

*Primary Examiner*—Paul R. Michl
*Attorney, Agent, or Firm*—Curtis, Morris & Safford

[57] ABSTRACT

The invention relates to a process for imparting permanent antistatic properties to filaments, fibers and sheets of homo- and copolymers of acrylonitrile by incorporation of alkylolamine salts of branched alkylbenzenesulfonic acids, the alkylol radical(s) having from 2 to 4 and the alkyl radical from 9 to 20 carbon atoms, and the filaments, fibers and sheets manufactured according to this process. The articles manufactured in this process have permanent antistatic properties and a high resistance to washing and cleaning.

9 Claims, No Drawings

PROCESS FOR THE MANUFACTURE OF ANTISTATIC FIBERS AND SHEETS OF POLYACRYLONITRILE

This is a continuation of application Ser. No. 509,703, filed Sept. 26, 1974 now abandoned.

Fibers and sheets made from synthetic polymers, for example from polyester, polyacrylonitrile or polyamides may be electrostatically charged because of their low water affinity. It is known to decrease the generally annoying electrostatic charge by treating the fibers, fabrics or sheets with baths, coatings, sizes or lubricants containing antistatically active substances. The abundant literature available in this field is for example cited in detail in Lindner, Tenside-Textilhilfsmittel und Waschrohstoffe (1964), Vol. II, pp. 1613 – 1625.

Most of these papers concern agents which impart only temporary antistatic properties to the synthetic fibers. The efficiency of the so-called permanent antistatics has hitherto been disputed (loc. cit.). These antistatics on synthetic fibers are made permanent by mixtures which form a film having a low swelling effect in water or solvents (M. Seidel, Textilveredelung 2 (1967), 6, pp. 356–361).

In German Auslegeschrift No. 1,209,542, there is described a process for producing an antistatic finish on native and synthetic fabrics and sheets with aromatic hydroxy group containing sulfonic acids and cross-linking substances, for example melamine resins, which react with the hydroxy groups in the finishing step. In principle, this comprises the production of an antistatic finish on completely manufactured articles brought about by film formation, and a pre-condition for obtaining this effect is the presence in the aromatic sulfonic acids of hydroxy groups capable of being cross-linked.

The most interesting possibility for industrially obtaining permanent antistatic effects fast to moisture, washing and cleaning on fibers and sheets of synthetic polymers by incorporation of antistatically active groups into the fiber or sheet raw materials or the spinning solution, however, has only very recently attracted more attention.

Thus, German Auslegeschrift No. 1,207,040 describes the antistatic finishing of polyacrylonitrile filaments spun from dimethyl sulfoxide by adding amylose and/or polyvinyl alcohol to the spinning solution.

U.S. Pat. No. 3,702,350 relates to permanent antistatic and hydrophilic effects on polyester fibers by incorporating aliphatic sulfonic acids in the melt spinning process.

U.S. Pat. No. 3,560,591 relates to a mixture of polyalkylene ethers, for example polyethyleneglycol or polypropyleneglycol, and alkali metal or alkaline earth metal salts of alkylbenzenesulfonic acids as incorporated antistatic agent for polyesters. However, it is expressly pointed out that the use of the single components per se does not result in good antistatic effects.

All these processes, despite the simplicity of operations, however, have not been introduced into the industrial practice, since the modification of the polymer in the melt spinning process generally results in a deterioration of the dyeability, the resistance and other important properties thereof.

Surprisingly, it has now been found that excellent antistatic effects are obtained on fibers and sheets of polyacrylonitrile by adding during the spinning process from 0.2 to 10%, preferably from 2 to 5% (relative to the polymer) of an alkylolamine salt having from 2 to 4 carbon atoms in the alkylol radical(s) of a branched alkylbenzenesulfonic acid having from 9 to 20, preferably from 12 to 15 carbon atoms in the alkyl radical, or mixtures of these alkylolamine salts. Suitable alkylolamine salts are above all the salts of the oxethylation products of ammonia and of lower mono- or dialkylamines, especially the salts of mono-, di- or triethanolamine. Preferred alkylbenzenesulfonic acids are the addition products of polymeric propylenes and butylenes, and benzenesulfonic acids, especially tetrapropylene-, pentapropylene- or tri- isobutylene-benzenesulfonic acid.

Especially good effects are obtained using the nono-ethanolamine salt of tetrapropylene-benzenesulfonic acid.

Using the cited alkylolamine salts of alkylaryl sulfonates, antistatic effects of poor permanence are obtained on practically all polymers; on wet spun polyacrylonitrile, however, good antistatic effects are obtained which are fast to moisture and resistant to several treatments by washing and cleaning.

Suitable fibers and sheets for the process of the invention are those made from pure polyacrylonitrile homopolymers and/or acrylonitrile copolymers having up to 40%, preferably up to about 15%, of comonomers, as mentioned for example in U.S. Pat. No. 3,170,877.

The alkylolamine salts of branched alkylbenzenesulfonic acids in accordance with the present invention are easily soluble in the solvents usual for the wet spinning of polyacrylonitrile, for example dimethyl formamide, dimethyl acetamide, dimethyl sulfoxide, ethylene carbonate, as well as mixtures of ethylene carbonate and ethyleneglycol, zinc chloride, nitric acid, sodium rhodamide solutions, etc.

Further additives, such as optical brighteners, dulling agents, dyestuffs, flame-retarding agents, substances for improving the sliding properties and other auxiliaries may be used in known manner.

The fibers or sheets obtained according to the process of the present invention possess antistatic properties which exhibit fastness to moisture, and very high resistance to washing and cleaning as a special advantage, without any adverse effect on the other properties of the fibers or sheets. Thus, tensile strength, elongation at break, elasticity and dyeability data (measured via the fiber saturation value, see Soc. of Dyers and Colorists, Aug. 1973, pp. 292 – 295) of fibers or sheets so finished remain practically unchanged.

The following examples illustrate the invention.

EXAMPLE 1:

To a spinning solution consisting of the solution of a copolymer of 91% of acrylonitrile and 9% of methylmethacrylate in dimethyl formamide (23% polymer content), 3% each of the following additives, relative to the polymer, are added, and this spinning solution is then spun into a coagulation bath of dimethyl formamide and water at a ratio of 65 : 35.

Additives:

1. none
2. nono-ethanolamine salt of tetrapropylene-benzenesulfonic acid (according to the present invention)
3. nono-ethanolamine salt of dodecylbenzenesulfonic acid 4. triethanolamine salt of laurinesulfonic acid.

The filaments, after washing, drawing and steaming, are processed to form a knitted tape, and the surface resistance in megohms at standard conditions (22° C/65% of relative humidity) is measured as an indication of the antistatic properties:

| No. | unwashed | 10 × 40° C washing |
|---|---|---|
| 1 | > 1.000.000 | > 1.000.000 |
| 2 | 250 | 400 |
| 3 | 400 | 200.000 |
| 4 | 600 | > 1.000.000 |

The following technological data are obtained (unwashed goods):

| No. | Titer dtex | Tenacity g | Tensile strength g/tex | elongation at break % |
|---|---|---|---|---|
| 1 | 151 | 460 | 30 | 10 |
| 2 | 158 | 544 | 34 | 12 |
| 3 | 166 | 430 | 26 | 8 |
| 4 | 154 | 514 | 33 | 8 |

EXAMPLE 2

The same spinning solution as described in Example 1 is wet-spun with the following additives:
1. none
2. 2.5% of diethanolamine salt of tetrapropylene-benzenesulfonic acid (according to the present invention)
3. 3% of the permethylated condensation product of 1 mol of di-ethylene-triamine with 1 mol of stearic acid.

The filaments treated according to the present invention (2) possess good processing properties, and there is no change of feel and no yellowing. The filaments treated with the cation active antistatic agent according to 3 split easily and show heavy yellowing.

The surface resistance is measured as indicated in Example 1:

| No. | unwashed | 1 washing at 40°C |
|---|---|---|
| 1 | > 1.000.000 | > 1.000.000 |
| 2 | 250 | 250 |
| 3 | 100 | > 1.000.000 |

The dyeability of the polyacrylonitrile filaments so treated, measured via the fiber saturation value shows that the additive according to the invention does not cause any modification within the limit of error.

| | Fiber saturation value |
|---|---|
| 1) no additive | 1.1 |
| 2) according to the invention | 1.2 |
| 3) cationic antistatic agent | 0.8 |

What is claimed is:

1. In a process for imparting permanent anti-static properties to filaments or fibers of acrylonitrile homopolymers and copolymers containing at least 60% of acrylonitrile units by incorporating an anti-static agent therein, the improvement which comprises using as an anti-static agent an alkylolamine salt of a branched alkylbenzenesulfonic acid, the alkylol radical having from 2 to 4 carbon atoms and the alkyl radical having from 9 to 20 carbon atoms.

2. In a filament or fiber of a homopolymer of acrylonitrile or a copolymer containing at least 60% of acrylonitrile units, said polymer containing from 0.2 to 10 weight percent, based on the weight of polymer, of an antistatic agent, the improvement which comprises an anti-static agent which is an alkylolamine salt of a branched alkylbenzene-sulfonic acid, the alkylol radical having from 2 to 4 carbon atoms and the branched alkyl radical having from 9 to 20 carbon atoms.

3. In a filament or fiber of a homopolymer of acrylonitrile or a copolymer containing at least 85% of acrylonitrile units, said polymer containing from 0.2 to 10 weight percent, based on the weight of the polymer, of an anti-static agent, the improvement which comprises an antistatic agent which is an alkylolamine salt of a branched alkylbenzenesulfonic acid, the alkylol radical having from 2 to 4 carbon atoms and the branched alkyl radical having from 9 to 20 carbon atoms.

4. The process as claimed in claim 1, wherein the alkylbenzenesulfonic acid contains from 12 to 15 carbon atoms in the alkyl radical.

5. The process as claimed in claim 1, wherein the alkylolamine component is mono-, di- or triethanolamine.

6. The process as claimed in claim 1, wherein the monoethanolamine salt of tetrapropylene-benzenesulfonic acid is used as alkylamine salt of the branched alkylbenzenesulfonic acid.

7. The process as claimed in claim 1, wherein the alkylolamine salt is added to the spinning solution of the polymer.

8. The process as claimed in claim 1, wherein the alkylolamine salt of branched alkylbenzenesulfonic acids is incorporated in an amount of from 0.2 to 10 weight % relative to the polymer.

9. The process as claimed in claim 1, wherein the alkylolamine salts of branched alkylbenzenesulfonic acids is incorporated in an amount of from 2 to 5 weight % relative to the polymer.

* * * * *

UNITED STATES PATENT AND TRADEMARK OFFICE
CERTIFICATE OF CORRECTION

PATENT NO. : 3,985,939
DATED : October 12, 1976
INVENTOR(S) : Rolf Kleber et al

It is certified that error appears in the above-identified patent and that said Letters Patent are hereby corrected as shown below:

In the Heading, Item [63], replace "509,703" by --509,743--.

In Column 1, line 2, replace "509,703" by --509,743--.

Signed and Sealed this

Eighteenth Day of January 1977

[SEAL]

Attest:

RUTH C. MASON
*Attesting Officer*

C. MARSHALL DANN
*Commissioner of Patents and Trademarks*